United States Patent
Golliver et al.

[11] Patent Number: 5,928,356
[45] Date of Patent: Jul. 27, 1999

[54] METHOD AND APPARATUS FOR SELECTIVELY CONTROLLING GROUPS OF REGISTERS

[75] Inventors: Roger A. Golliver, Beaverton, Oreg.; Jerome C. Huck, Palo Alto; Dale C. Morris, Menlo Park, both of Calif.

[73] Assignee: Institute for the Development of Emerging Architectures, L.L.C., Cupertino, Calif.

[21] Appl. No.: 08/947,541

[22] Filed: Oct. 11, 1997

[51] Int. Cl.⁶ .................................................. G06F 9/312
[52] U.S. Cl. ........................................ 712/228; 711/100
[58] Field of Search .................................. 395/569, 678; 711/100; 712/228

[56] References Cited

U.S. PATENT DOCUMENTS 4,672,532  6/1987  JongeVos .................................. 707/104
5,414,864  5/1995  Kolzami .................................... 395/569

Primary Examiner—Eric Coleman
Attorney, Agent, or Firm—Blakely, Sokoloff, Taylor & Zafman, LLP

[57] ABSTRACT

A method and apparatus for controlling groups of registers includes a plurality of registers of the same type logically separated into a plurality of groups and a plurality of indicators corresponding to the plurality of groups of registers, each of the plurality of indicators identifying whether a corresponding group of registers has been modified by a task currently being executed by the processor. A control logic is also included, coupled to the plurality of registers, to selectively control the plurality of registers by group based at least in part on the plurality of indicators.

17 Claims, 9 Drawing Sheets

METHOD AND APPARATUS FOR SELECTIVELY CONTROLLING GROUPS OF REGISTERS

BACKGROUND OF THE INVENTION

1. Field of the Invention

The present invention pertains to the field of processor architecture. More particularly, this invention relates to selectively controlling groups of registers in a processor.

2. Background

Modern computer systems frequently execute multiple software programs concurrently, a feature commonly referred to as multi-tasking. Each instance of an application being executed is commonly referred to as a "task". In order to multi-task on a computer system having a single processor, the various tasks share the single processor. Typically, the processor executes instructions from a particular task for a period of time, often referred to as a time slice, and then switches tasks to begin executing instructions from a second task during a second time slice. This switching of tasks is commonly referred to as a "context switch".

One feature found in most processors is a register set. The register set typically comprises multiple registers that store various control information related to the tasks being executed. Additionally, the register set also typically contains multiple data registers that can be accessed by programmers in order to save data.

In a multi-tasking computer system, it is necessary to save at least some of the registers in the register set during a context switch because there is typically only one register set for all tasks to use, regardless of how many tasks are being multi-tasked. For example, if two tasks are being executed by a processor, then the task-specific control information and data must be maintained by the processor for each of the tasks. Typically, all of the registers are saved to memory when a context switch occurs and the contents of the registers for the task that is about to begin execution by the processor are restored to the register set from memory. These contents would typically be the contents that were saved the last time the processor stopped executing the task in order to switch to a different task. This saving and restoring of register contents is typically referred to as "swapping".

However, saving and restoring the entire contents of the register set during a context switch may not always be necessary. For example, a newly executing task may access but not modify a particular group of registers during the time period it is executing. Therefore, it is not necessary for the group of registers to be re-saved during the next context switch. The unnecessary saving of the states of the groups of the register set results in a wasted delay, which is increased as register sets grow larger and larger. Thus, it would be beneficial to provide a way to reduce the amount of unnecessary register saving which occurs during a context switch.

As will be described in more detail below, the present invention provides a method and apparatus for selectively controlling groups of registers to achieve these and other desired results which will be apparent to those skilled in the art from the description that follows.

SUMMARY OF THE INVENTION

A method and apparatus for controlling groups of registers is described herein. An apparatus is disclosed which includes a plurality of registers of the same type logically separated into a plurality of groups and a plurality of indicators corresponding to the plurality of groups of registers, each of the plurality of indicators identifying whether a corresponding group of registers has been modified by a task currently being executed by the processor. The apparatus also includes a control logic, coupled to the plurality of registers, to selectively control the plurality of registers by group based at least in part on the plurality of indicators.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, various embodiments of the present invention will be described. However, it will be understood by those skilled in the art that the present invention may be practiced with only some or all aspects of these embodiments. For purposes of explanation, specific numbers, materials and configurations are set forth in order to provide a thorough understanding of the present invention. However, it will also be apparent to those skilled in the art that the present invention may be practiced without these specific details.

In the discussions to follow, reference is made to both "tasks" and "processes". A task refers to a series of instructions related to a computer program which is under the direct control of an operating system, whereas a process refers to a series of instructions related to a task which is under the direct control of the task. A task is typically one or more processes each having separate address spaces. Reference is also made to "threads", which are different execution paths in the same address space of a process.

Figure 1:
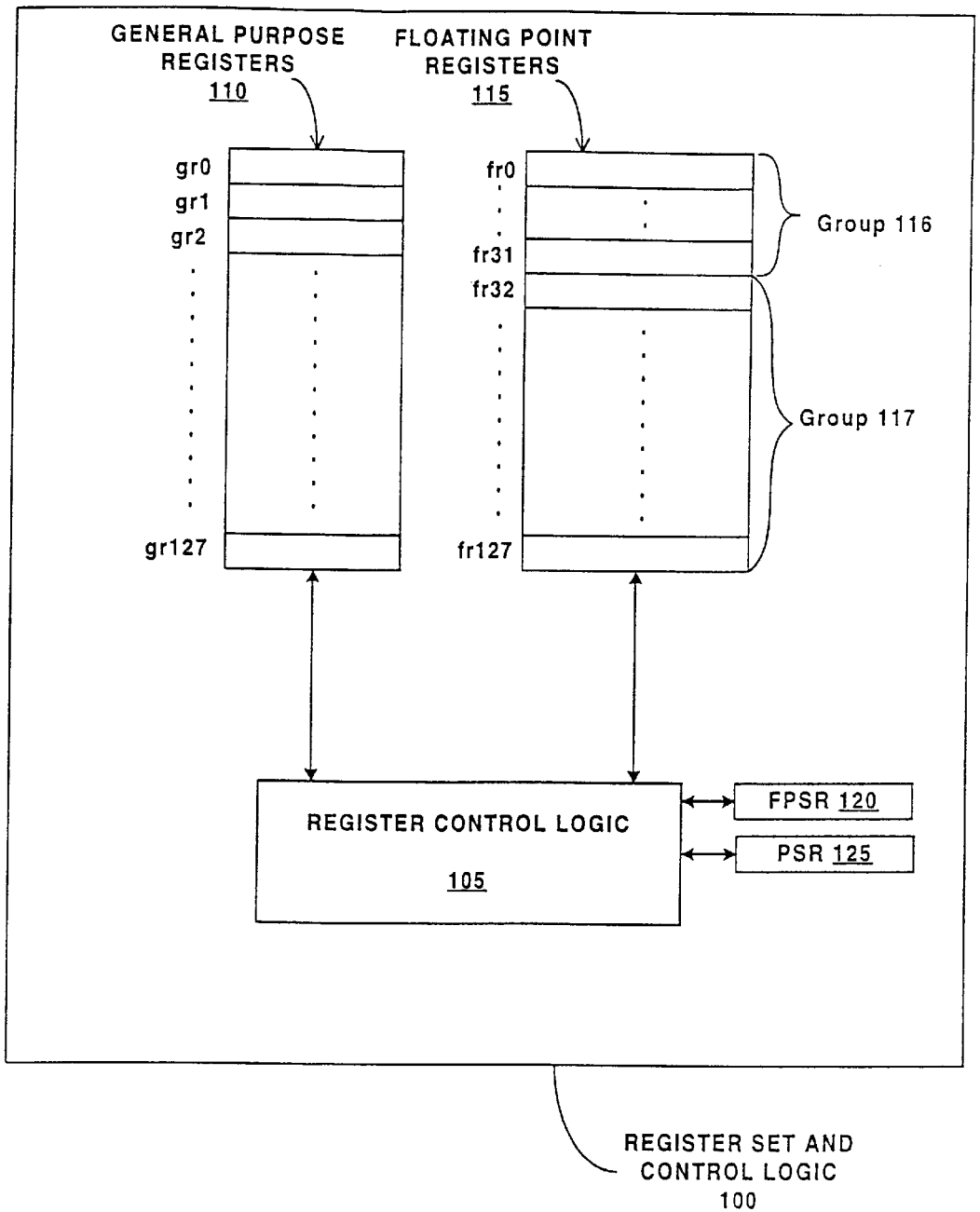
FIG. 1 illustrates a register set and associated control logic according to one embodiment of the present invention.

FIG. 1 illustrates a register set and associated control logic according to one embodiment of the present invention. The register set and control logic 100 includes register control logic 105, multiple general purpose registers 110, multiple floating point registers 115, at least one floating point status register (FPSR) 120, and at least one processor status register (PSR) 125.

Each of the general purpose registers 110 can be used by tasks or processes being executed by a processor for the storage of integer data. Each of the floating point registers 115 can be used by tasks or processes being executed by the processor for the storage of either integer or floating point data. The data which is contained in a register of either the general purpose registers 110 or the floating point registers 115 is referred to as the "state" or "contents" of that register. In one implementation of the present invention, the first floating point register (fr0) is hardwired to the value 0.0, and the second floating point register (fr1) is hardwired to the value 1.0. In this implementation, the first two floating point registers (fr0 and fr1) cannot be used by a task or process to store other values. However, it is to be appreciated that alternate implementations of the present invention may not have the first two floating point registers hardwired to predetermined values, and that all 128 of the floating point registers 115 can be used by tasks to store different values.

In the illustrated embodiment, the register set and control logic 100 includes 128 general purpose registers 110 and 128 floating point registers 115. However, it is to be appreciated that different embodiments can include different numbers of general purpose and floating point registers. According to one embodiment of the present invention, each of the general purpose registers is a 64-bit register and each of the floating point registers is an 82-bit register. However, it is to be appreciated that different sized registers could be used to implement the general purpose registers and floating point registers. It is also to be appreciated that the registers 110 and 115 can be implemented in any of a wide variety of conventional manners, such as by using latches or static random access memory (SRAM) cells.

A wide variety of additional registers (not shown) may also be included in the register set and control logic 100. For example, additional control registers may be included which contain control information regarding the operational state of the processor. By way of another example, additional registers may be included which track branch predictions and potential branches during execution of a task.

The FPSR 120 in the illustrated embodiment is a 64-bit register. The FPSR 120 maintains status information for floating point operations being executed by the processor. The PSR 125 in the illustrated embodiment is a 64-bit register. The PSR 125 maintains status information for the task currently being executed by the processor. It is to be appreciated that in alternate embodiments, the FPSR 120 and PSR 125 can be different sized registers. It is also to be appreciated that the registers 120 and 125 can be implemented in any of a wide variety of conventional manners, such as by using latches or static random access memory (SRAM) cells.

The register control logic 105 controls the general purpose registers 110, floating point registers 115, PSR 125, and FPSR 120. The register control logic 105 monitors accesses to the general purpose registers 110 and floating point registers 115 and updates the PSR 125 and FPSR 120 as necessary based on these accesses.

Additionally, the register control logic 105 also controls the swapping of register contents between the registers 110 and 115 and memory (not shown in FIG. 1). Swapping of register contents refers to the saving of the current contents of the registers to memory (e.g., a cache memory (not shown) within the processor or a memory (not shown in FIG. 1) external to the processor chip) and the restoring of previously saved contents into the registers. The storing of register contents to memory and the restoring of previously saved contents is well-known in the art and thus will not be discussed further except as it pertains to the present invention.

As illustrated in FIG. 1, the floating point registers are logically separated into two groups, group 116 and group 117. The group 116 includes the first 32 floating point registers 115 and is referred to as the "low" group. The group 117 includes the upper 96 floating point registers 115 and is referred to as the "high" group. By logically separating the floating point registers 115 into two separate groups, the register control logic 105 is able to selectively save and restore the contents of the floating point registers 115 in groups, as well as track accesses to the floating point registers 115 in groups. For example, the register control logic 105 is able to save, and subsequently restore, only the 32 floating point registers in the group 116 rather than all 128 floating point registers.

It is to be appreciated that in different embodiments, different logical separations can occur. For example, in one alternate embodiment, the low group may comprise 16 registers while the high group comprises 112 registers. According to one embodiment the logical separation of registers should balance having the smaller set being large enough to handle the storage typically required for integer tasks yet small enough so that a large number of floating point registers do not need to be saved for integer tasks.

It is also to be appreciated that the registers could be separated into any number of logical groups within the spirit and scope of the present invention. By way of example, the registers could be separated into three or more logical groups rather than two logical groups.

Figure 2:
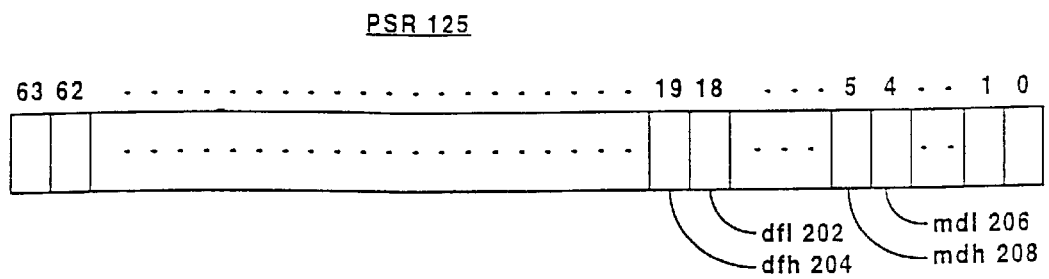
FIG. 2 illustrates a processor status register in more detail according to one embodiment of the present invention.

Additional indicators are included in the PSR 125 to support these different groups. According to one embodiment, each of these indicators is a different bit in the PSR 125. FIG. 2 illustrates the processor status register in more detail according to one embodiment of the present invention. The PSR 125 includes two bits, one of which is the disabled floating point low register set (dfl) bit 202, and the second of which is the disabled floating point high register set (dfh) bit 204. The setting of the dfl and dfh bits 202 and 204 in the PSR 125 is done by the register control logic 105. Which of the bits 202 and/or 204 is set, and when it is set, is determined by the operating system, as discussed in more detail below.

In one embodiment of the present invention, the dfl and dfh bits 202 and 204 can be set and read using a move command. In one implementation, the move command can read the bits 202 and 204 by moving them into one of the general purpose registers 110 using a "mov gr=psr.l" command to transfer the dfl bit 202 into the general purpose register identified by "gr", and a "mov gr=psr.h" command to transfer the dfh bit 204 into the general purpose register identified by "gr". Similarly, a "mov psr.l=gr" command can be used to transfer the value in the general purpose register identified by "gr" into the dfl bit 202 and a "mov psr.h=gr" command can be used to transfer the value in the general purpose register identified by "gr" into the dfh bit 204.

The dfl and dfh bits 202 and 204 provide control for the selective disabling of different groups of the floating point registers 115 of FIG. 1. In the illustrated embodiment, the dfl bit 202 corresponds to the group 116 and the dfh bit 204 corresponds to the group 117. The dfl bit 202 being set (for example, the dfl bit 202 is a logical one) indicates to the register control logic 105 that the floating point registers of group 116 are currently disabled. Similarly, the dfh bit 204 being set indicates to the register control logic 105 that the floating point registers of group 117 are currently disabled. When a group of registers is disabled, the task being executed cannot access the registers of that group.

Figure 3:
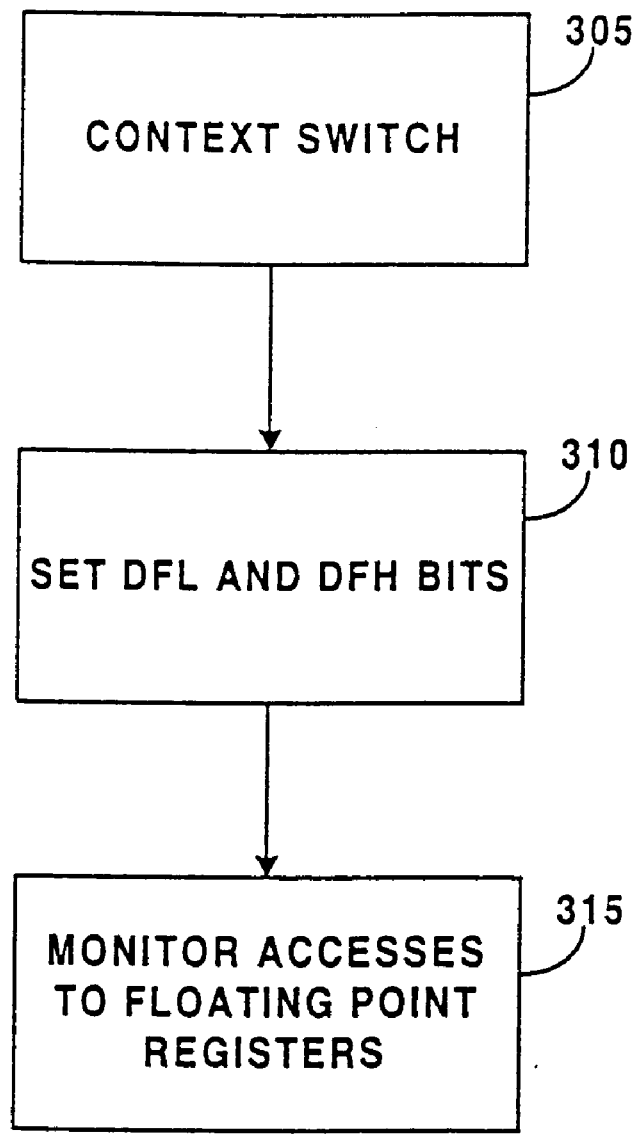
FIG. 3 is a flowchart illustrating the steps followed in using the group disabled indicators during a context switch according to one embodiment of the present invention.

FIG. 3 is a flowchart illustrating the steps followed in using the group disabled indicators during a context switch according to one embodiment of the present invention. The context switch is first initiated, step 305. The context switch can be initiated in response to any of a wide variety of conditions, such as the current time slice expiring. During the context switch the register control logic, in response to the operating system, sets the dfl and dfh bits, step 310, and proceeds to monitor accesses to the floating point registers, step 315. Thus, although the state of the floating point registers was not saved, the groups of floating point registers are disabled so that, as discussed in more detail below, the groups of floating point registers can be subsequently saved if necessary.

Figure 4:
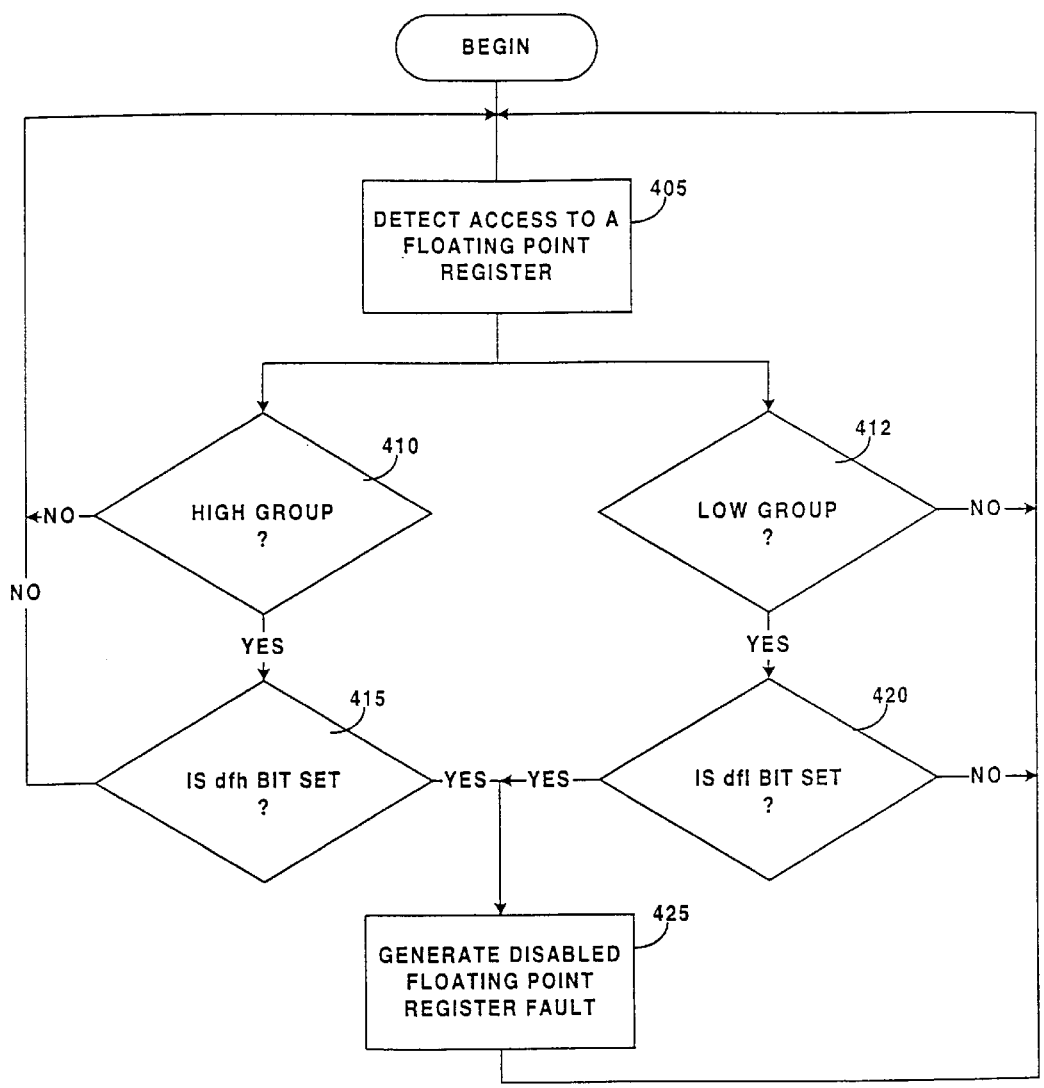
FIG. 4 is a flowchart illustrating the steps taken by the register control logic in using the group disabled indicators according to one embodiment of the present invention.

FIG. 4 is a flowchart illustrating the steps taken by the register control logic in using the group disabled indicators according to one embodiment of the present invention. The register control logic continually monitors accesses to the registers in the processor (both reads from and writes to), as discussed above. When an access to a floating point register is detected, step 405, the register control logic checks whether the access is to the high group, step 410, or to the low group, step 412. If the access is to neither the high group nor the low group, then the register control logic continues to monitor accesses to the registers. However, if the access is to the high group, then the register control logic checks whether the dfh bit in the PSR is set, step 415. If the dfh bit is not set, then the register control logic continues to monitor accesses to the registers. However, if the dfh bit is set, then the register control logic generates a disabled floating point register fault, step 425. The disabled floating point register fault indicates to the operating system that an attempt was made to access a floating point register which is disabled. Before allowing an access to a register in a group that is disabled, the contents of the disabled group of floating point registers will have to be stored in memory first, and the appropriate stored floating point register contents restored to the group floating point registers.

Returning to step 412, if the access is to the low group, then the register control logic checks whether the dfl bit in the PSR is set, step 420. If the dfl bit is not set, then the register control logic continues to monitor accesses to the registers. However, if the dfl bit is set, then the register control logic generates a disabled floating point register fault, step 425, causing the low group to be stored in memory.

In one embodiment of the present invention, as discussed in more detail below, whether a disabled group(s) of registers are to be saved is dependent at least in part on the modified indicators for the groups.

According to one embodiment of the present invention a 64-bit interrupt vector is generated by the register control logic 105 of FIG. 1. If the register control logic 105 detects an access to a floating point register which causes a disabled floating point fault, as discussed above with reference to FIG. 4, then the register control logic 105 encodes various control information into the interrupt vector, including the address to vector to in order to process the fault. In one embodiment the interrupt vector provides control information to the operating system that is used for the operating system to properly handle the fault.

The register control logic 105 stores enough information to allow the system to be returned from the interrupt. In one embodiment this information is encoded in the interrupt vector. Alternatively, the information could be stored in a cache or other memory. In one embodiment, this information includes the ISR, which identifies the address of the last successfully executed instruction and also identifies whether the fault was caused by an access to the high group or the low group, the Interrupt Instruction Pointer (IIP), which identifies the address of the fault, and the Interrupt Processor Status Register (IPSR), which is a copy of the PSR. Faults and interrupts are well-known to those skilled in the art and thus will not be discussed further except as they pertain to the present invention.

Figure 5:
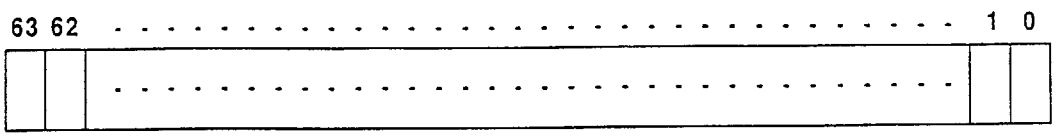
FIG. 5 illustrates an interrupt status register according to one embodiment of the present invention.

FIG. 5 illustrates the interrupt status register (ISR) according to one embodiment of the present invention. In the illustrated embodiment bit 0 of the ISR 500 is set (e.g., a logical one) if an access to a register in the low group causes the fault, and bit 1 of the ISR 500 is set (e.g., a logical one) if an access to a register in the high group causes the fault. It should be noted that a single instruction could result in the setting of both bits 0 and 1, and that this situation could generate two separate faults, either of which could be processed first, or could generate a single fault.

Returning to FIG. 2, the PSR 125 includes two bits, one of which is the modified low (mdl) bit 206, and the second of which is the modified high (mdh) bit 208. According to one embodiment of the present invention, the mdl and mdh bits 206 and 208, also referred to as the "user mask" or "um" bits, are user-level accessible and can be read using "mov gr=um" commands, analogous to the discussion above regarding the dfl and dfh bits 202 and 204. Additionally, according to one implementation, "set" and "clear" commands are used to directly set and clear, respectively, the mdl and mdh bits 206 and 208. According to an alternate embodiment of the present invention, the setting of the mdl and mdh bits 206 and 208 in the PSR 125 is done by the register control logic 105.

The mdl and mdh bits 206 and 208 provide control for the selective saving and restoring of different groups of floating point registers 115 of FIG. 1. In the illustrated embodiment, mdl bit 206 corresponds to group 116 and mdh bit 208 corresponds to group 117. The mdl bit 206 being set (for example, the mdl bit 206 is a logical one) indicates to the register control logic 105 that at least one of the floating point registers of group 116 has been modified since the floating point registers 115 were last restored. Similarly, the mdh bit 208 being set indicates to the register control logic 105 that at least one of the floating point registers of group 117 has been modified since the floating point registers 115 were last restored.

Figure 6:
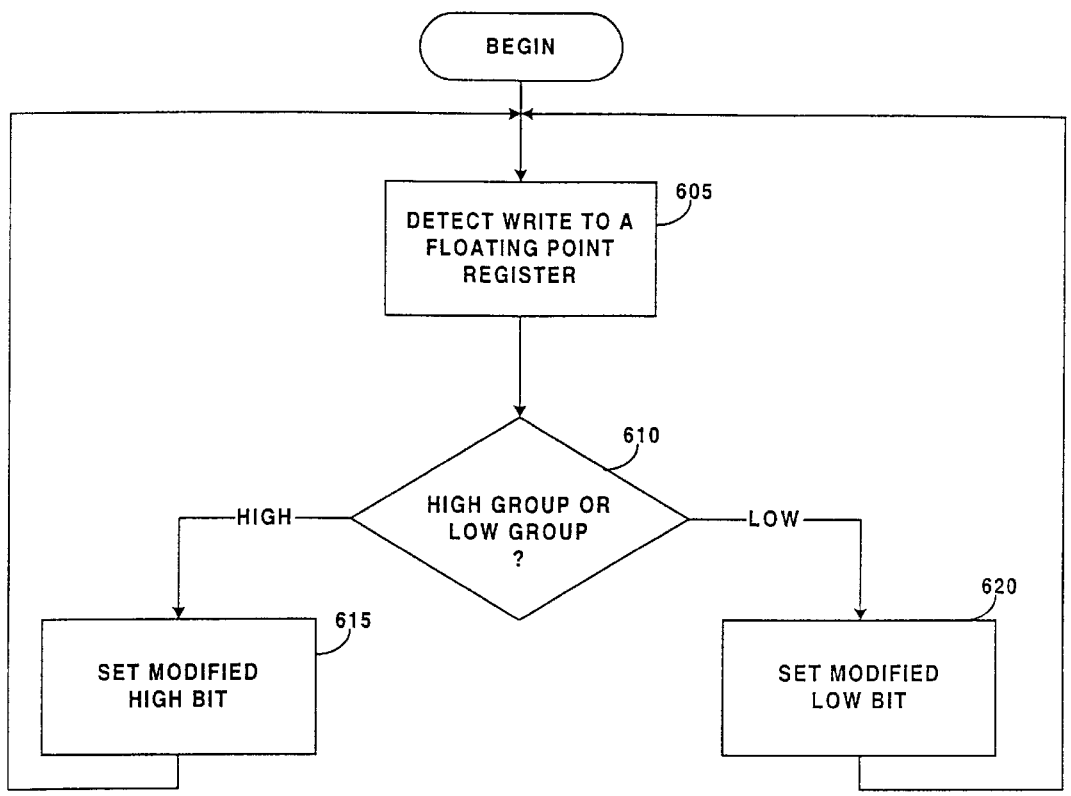
FIG. 6 is a flowchart illustrating the steps followed by the register control logic in setting the modified indicators according to one embodiment of the present invention.

FIG. 6 is a flowchart illustrating the steps followed by the register control logic in setting the modified indicators according to one embodiment of the present invention. The register control logic continually monitors accesses to the registers in the processor, as discussed above. When a write to a floating point register is detected, step 605, the register control logic checks whether the write is to the high group or the low group, step 610. If the write is to the high group, then the register control logic sets the modified high bit, step 615, then continues to monitor accesses to the registers. However, if the write is to the low group, then the register control logic sets the modified low bit, step 620, and then continues to monitor accesses to the registers. It is to be appreciated that a single instruction could cause the setting of both the modified high and modified low bits 208 and 206. For example, an instruction could write to two different registers, one in the high group and one in the low group.

Additionally, each of the modified bits in the PSR allow the operating system to decide when it needs to save the corresponding floating point registers. For example, if the contents of the floating point registers have been restored for a current task and the modified bit for the low group has been set during execution of the task but the modified bit for the high group has not been set during execution of the task, then at the next context switch the operating system can save the state of the floating point registers in the low group, but need not save the state of the floating point registers in the high group because their state was already stored in memory and has not been changed. Thus, groups of registers need only be saved when they have been modified and time need not be unnecessarily expended to save registers which have not been modified.

In one implementation of the present invention the modified indicators are cleared as part of a context switch. In an alternate implementation, when the modified indicators are used in conjunction with the disabled indicators, the modified indicators are cleared when the register group(s) contents are restored. Thus, even though the modified indicators are not cleared as part of the context switch, they are subsequently cleared if necessary.

Figure 7:
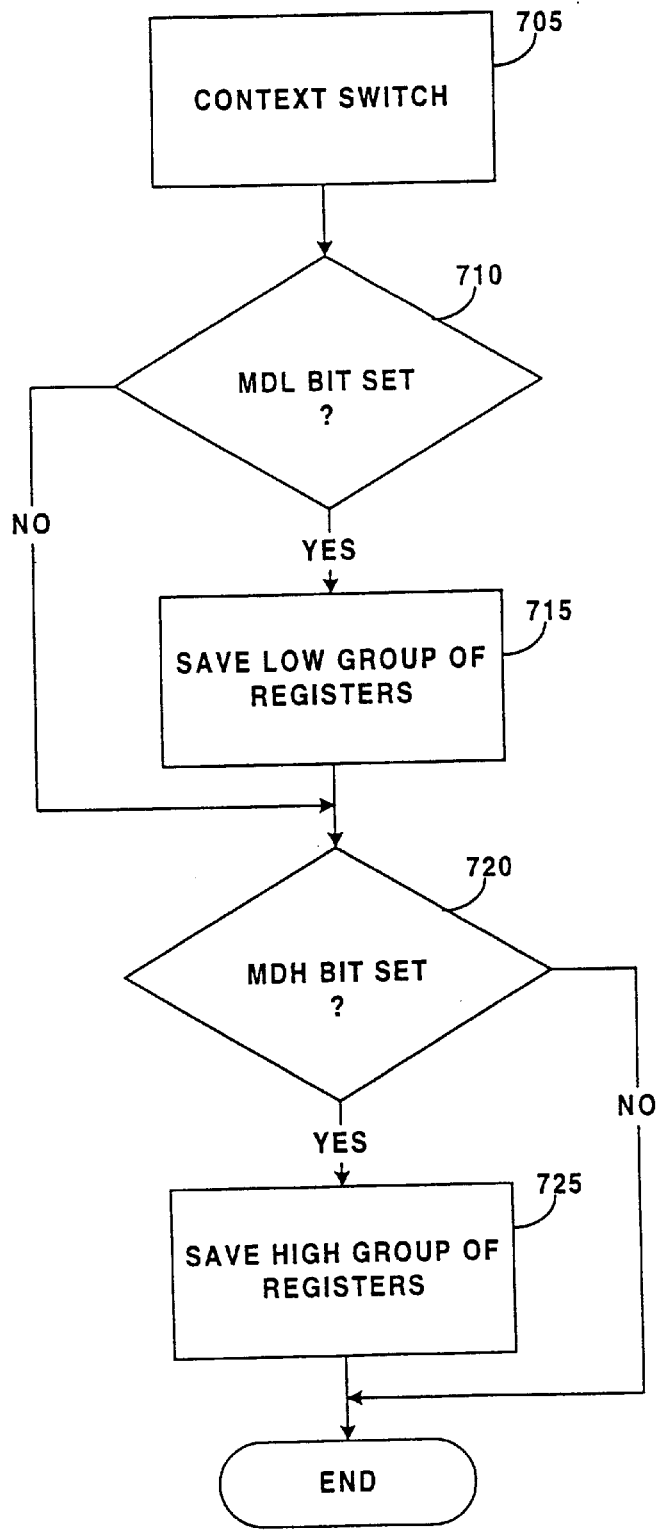
FIG. 7 is a flowchart illustrating the steps followed in using the modified indicators during a context switch according to one embodiment of the present invention.

FIG. 7 is a flowchart illustrating the steps followed in using the modified indicators during a context switch according to one embodiment of the present invention. The context switch is first initiated, step 705. The context switch can be initiated in response to any of a wide variety of conditions, such as the current time slice expiring. During the context switch the module responsible for the switch (the operating system in the case of a task switch, and a task in the case of a process switch) checks whether the mdl bit is set, step 710. If the mdl bit is not set, then the module proceeds to check whether the mdh bit is set, step 720. However, if the mdl bit is set, then the low group of floating point registers is saved, step 715, and then the module checks whether the mdh bit is set, step 720. If the mdh bit is not set, then the saving process for the floating point registers during the context switch ends. However, if the mdh bit is set, then the high group of floating point registers is saved, step 725, prior to the saving process for the floating point registers during the context switch ending.

The present invention provides significant advantages and abilities to the processor by allowing it to treat the different groups of registers differently. For example, the operating system could decide to save the contents of all the floating point registers upon a context switch, or alternatively save only a particular group. The operating system can make its decisions on which group(s) to save based on the tasks it typically executes (e.g., more integer tasks or more floating point tasks), or the operating system could monitor the tasks it is executing and develop a heuristic of which group(s) of floating point registers to save based on past behavior of a particular task. Similarly, in the case of a process switch, a task could make decisions on which group(s) to save based on the processes it typically executes, or the task could monitor the processes it is executing and develop a heuristic of which group(s) of floating point registers to save based on past behavior of a particular process.

Furthermore, it should be noted that compilers can be modified to take advantage of the present invention. For example, a compiler could be programmed to favor the use of the low group of registers for integer tasks, thereby reducing the chances of both groups of floating point registers requiring saving during execution of an integer task.

Furthermore, according to one embodiment of the present invention, at least a portion of the PSR, including the mdl bit 206 and the mdh bit 208 is user-level accessible. Thus, tasks being executed have the ability to make use of the modified bits in the PSR. This can be done in a manner analogous to that done in context switching by the operating system, with the task executing multiple processes which make use of the PSR. The task can itself control swapping of register contents to memory for different processes. Similarly, a process can control swapping of register contents for different threads. Thus, it should be noted that "context switching" as used herein refers to the switching of tasks by an operating system and the switching of processes by a task, as well as the switching of threads by a process.

However, in an alternate embodiment of the present invention, the portion of the PSR including the mdl bit 206 and the mdh bit 208 are not user-level accessible. Thus, in this alternate embodiment, only the operating system is able to make use of the modified bits in the PSR.

Additionally, according to another alternate embodiment of the present invention, the dfl and dfh bits 202 and 204 are also user-level accessible.

It should be noted that, in embodiments where the mdl and mdh bits 206 and 208 are user-accessible, the operating system can either use or ignore the mdl and mdh bits 206 and 208. Thus, in certain embodiments, even though the operating system has access to the mdl and mdh bits 206 and 208, the operating system may not alter them so as not to interfere with, for example, thread switching by a process.

Figure 8:
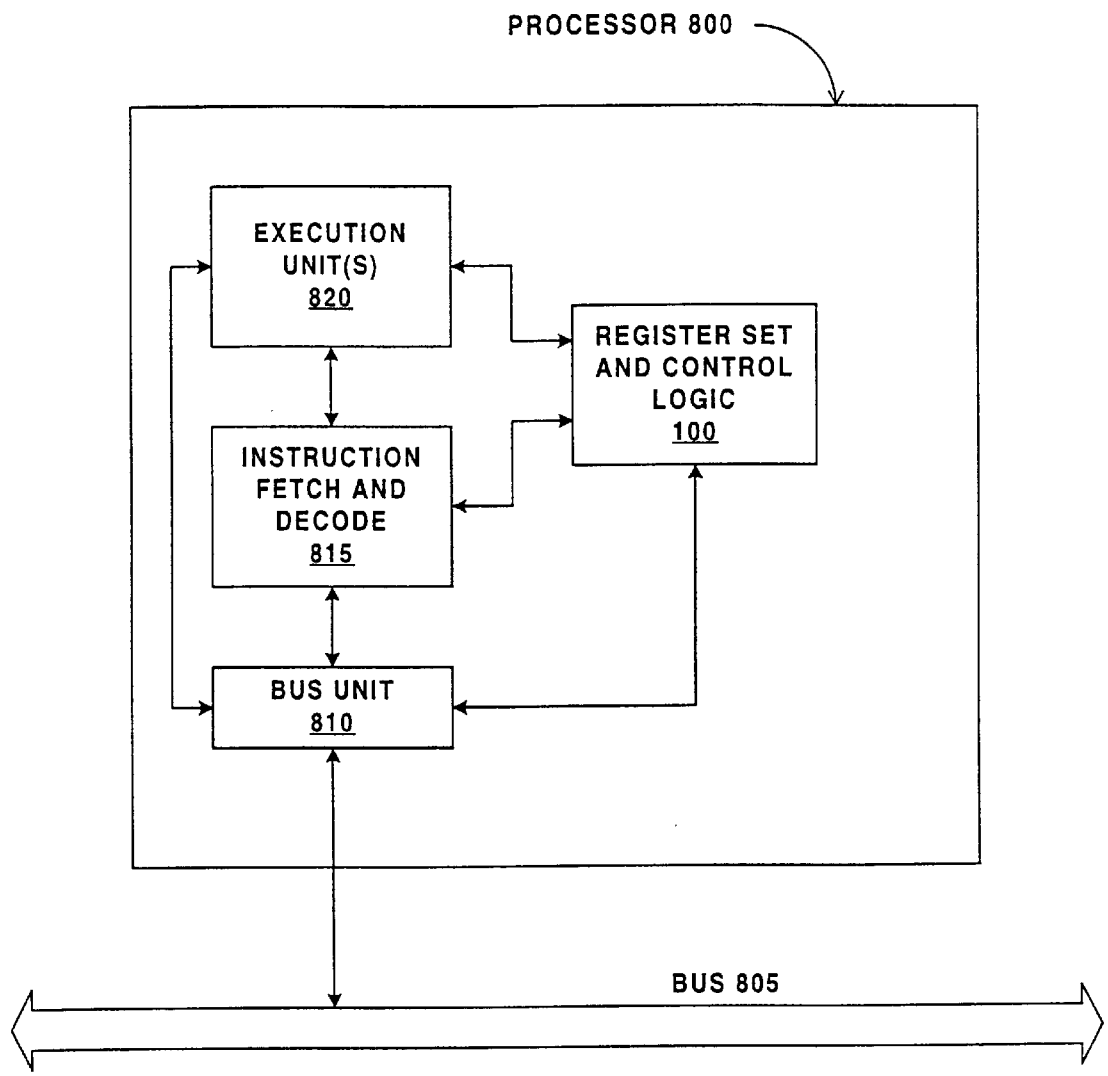
FIG. 8 is a block diagram illustrating a processor in which the present invention may be used.

FIG. 8 is a block diagram illustrating a processor in which the present invention may be used. FIG. 8 illustrates a processor 800 including a bus unit 810, instruction fetch and decode logic 815, one or more execution units 820, and register set and control logic 100. The bus unit 810 provides an interface between the processor 800 and the bus 805, allowing input of data, instructions, and control information to the processor 800 from external devices (not shown) coupled to the bus 805, and also allowing for output of data, instructions, and control information from the processor 800 to these other external devices. The instruction fetch and decode logic 815 fetches instructions from memory which are expected to be executed by the processor 800. These instructions are then fed to the one or more execution units 820. The register set and control logic 100, as discussed above, includes the various registers and register control logic for the processor 800.

Figure 9:
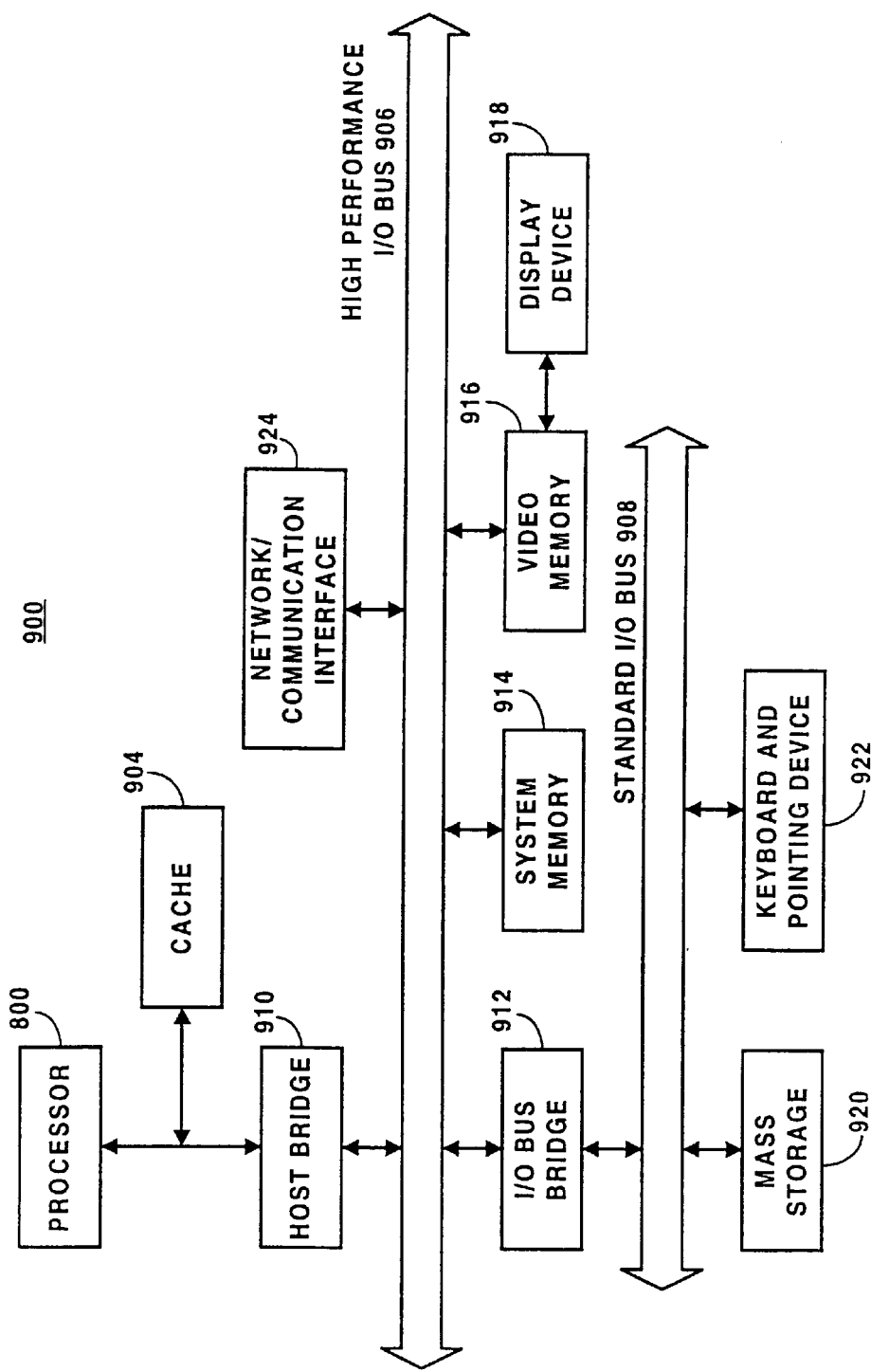
FIG. 9 illustrates one embodiment of a computer system such as may be used with one embodiment of the present invention.

FIG. 9 illustrates one embodiment of a computer system such as may be used with one embodiment of the present invention. In the illustrated embodiment, computer system 900 includes at least one processor 800 and cache memory 904 coupled to each other as shown. Additionally, computer system 900 includes high performance input/output (I/O) bus 906 and standard I/O bus 908. Host bridge 910 couples processor 800 to high performance I/O bus 906, whereas I/O bus bridge 912 couples the two buses 906 and 908 to each other. Coupled to bus 906 are system memory 914 and video memory 916. In turn, display device 918 is coupled to video memory 916. Coupled to bus 908 is mass storage 920 and keyboard and pointing device 922.

These elements 902–922 perform their conventional functions known in the art. In particular, mass storage 920 is used to provide permanent storage for the data and programming instructions to implement the above described functions, whereas system memory 914 is used to provide temporary storage for the data and programming instructions when executed by processor 800. Mass storage 920 may be provided with the programming instructions by loading the programming instructions from a distribution storage medium (not shown), or by downloading the programming distributions from a server (not shown) coupled to computer system 900 via a network/communication interface (not shown). According to one embodiment of the present invention, the processor 800 supports an x86 instruction set.

It is to be appreciated that various components of computer system 900 may be rearranged. For example, cache 904 may be on-chip with processor 800. Furthermore, certain implementations of the present invention may not require nor include all of the above components. For example, mass storage 920, keyboard and pointing device 922, and/or display device 918 and video memory 916 may not be included in system 900. Additionally, the peripheral devices shown coupled to standard I/O bus 908 may be coupled to high performance I/O bus 906; in addition, in some implementations only a single bus may exist with the components of computer system 900 being coupled to the single bus. Furthermore, additional components may be included in system 900, such as additional processors, storage devices, or memories.

In the above discussions, the floating point registers are described as being separated logically into groups. However, it is to be appreciated that the present invention can be applied equally to any of a wide variety of types of registers which may be included in a processor, such as general purpose registers, branch prediction registers, etc.

Also in the discussions above, the swapping of registers is discussed in relation to multi-tasking. However, it is to be appreciated that the present invention is equally applicable to any situation in which multiple processes being executed share a set of registers. For example, the present invention can apply equally to situations where the registers are shared between a currently executing task and the instructions being executed due to generation of a fault.

Also in the discussions above, reference is made to both disabled indicators and modified indicators. In one embodiment of the present invention, both the disabled indicators and the modified indicators are used concurrently. In this embodiment the disabled identifiers are accessed prior to setting any modified indicators to ensure that the registers being accessed are enabled. According to another embodiment, the disabled indicators are used but the modified indicators are not used. According to another embodiment, the modified indicators are used but the disabled indicators are not used.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A processor comprising:

a plurality of registers of the same type logically separated into a plurality of groups;

a first plurality of indicators corresponding to the plurality of groups of registers, each of the first plurality of indicators identifying whether a corresponding group of registers has been modified by a first task executed by the processor; and a control logic, coupled to the plurality of registers, to selectively control the plurality of registers by group based at least in part on the first plurality of indicators such that, during execution of a second task, modification of a register belonging to a particular group causes the particular group of registers to be saved prior to modification of the register by the second task.

2. The processor of claim 1, wherein each of the first plurality of indicators is user accessible.

3. The processor of claim 1, wherein the control logic is configured to save a first group of the plurality of groups without saving the other one or more groups of the plurality of groups in response to a task accessing a register of the first group.

4. The processor of claim 1, wherein each of the plurality of registers is a floating point register.

5. The processor of claim 1, wherein the plurality of groups comprises a high group and a low group.

6. The processor of claim 1, further comprising a second plurality of indicators corresponding to the plurality of groups of registers, each of the second plurality of indicators identifying whether a corresponding group of registers stores data corresponding to a task currently being executed by the processor.

7. The processor of claim 6, wherein each of the second plurality of indicators is a bit of a status register.

8. The processor of claim 1, wherein each of the first plurality of indicators is a bit of a status register.

9. The apparatus of claim 1, wherein each of the first plurality of indicators is user accessible.

10. An apparatus comprising:

a plurality of registers of the same type logically separated into a plurality of groups;

a first plurality of indicators corresponding to the plurality of groups of registers, each of the first plurality of indicators identifying whether a corresponding group of registers has been modified by a first task executed by the processor; and a control logic, coupled to the plurality of registers, to selectively control the plurality of registers by group based at least in part on the first plurality of indicators such that, during execution of a second task, modification of a register belonging to a particular group causes the particular group of registers to be saved prior to modification of the register by the second task.

11. The apparatus of claim 10, wherein the control logic is configured to save a first group of the plurality of groups without saving the other one or more groups of the plurality of groups in response to a task accessing a register of the first group.

12. The apparatus of claim 10, further comprising a second plurality of indicators corresponding to the plurality of groups of registers, each of the second plurality of indicators identifying whether a corresponding group of registers stores data corresponding to a task currently being executed by the processor.

13. A method of controlling registers comprising:

logically separating a plurality of registers of the same type into a plurality of groups;

identifying whether a corresponding group of registers has been modified by a first task executed by the processor; and selectively controlling the plurality of registers by group based at least in part on the identifying such that, during execution of a second task, modification of a register belonging to a particular group causes the particular group of registers to be saved prior to modification of the register by the second task.

14. The method of claim 13, wherein the selectively controlling comprises selectively saving and restoring contents of the plurality of registers by group.

15. The method of claim 13, wherein the selectively controlling further comprises selectively saving and restoring the contents of the plurality of registers by group in response to a switch of current tasks by an operating system.

16. The method of claim 13, wherein the selectively controlling further comprises saving a first group of the plurality of groups without saving the other one or more groups of the plurality of groups in response to a task accessing a register of the first group.

17. The method of claim 13, wherein the selectively controlling further comprises identifying whether a particular group of the plurality of groups of registers stores data corresponding to a currently executing task.

* * * * *